United States Patent
Crowley et al.

(10) Patent No.: US 6,355,895 B1
(45) Date of Patent: *Mar. 12, 2002

(54) SPACING STRUCTURES FOR LARGE TOUCH PANELS

(75) Inventors: Brendan J. Crowley, North Andover; Stephen P. Atwood, Worcester, both of MA (US); Steven J. Buelte, Alford, NY (US); Bernard O. Geaghan, Salem, NH (US)

(73) Assignee: Greensteel, Inc., Norcross, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/178,653

(22) Filed: Oct. 26, 1998

(51) Int. Cl.[7] .................................................. H01H 1/10
(52) U.S. Cl. ........................ 200/512; 200/514; 328/295
(58) Field of Search ............................... 200/512–517, 200/265; 338/99, 100, 114, 101, 47; 345/173

(56) References Cited

U.S. PATENT DOCUMENTS

| | | | | |
|---|---|---|---|---|
| 4,467,151 A | | 8/1984 | Johnson | 200/5 A |
| 4,524,256 A | * | 6/1985 | Miyata et al. | 200/86 R |
| 4,525,606 A | * | 6/1985 | Sado | 200/5 A |
| 4,529,959 A | * | 7/1985 | Ito et al. | 338/295 |
| 4,965,421 A | * | 10/1990 | Epperson | 200/514 |
| 5,014,224 A | * | 5/1991 | Hans | 338/99 |
| 5,374,796 A | * | 12/1994 | Plummer | 200/512 |
| 5,563,381 A | | 10/1996 | Crooks et al. | |
| 5,886,615 A | * | 3/1999 | Burgess | 338/114 |

\* cited by examiner

Primary Examiner—P. Austin Bradley
Assistant Examiner—Nhung Nguyen
(74) Attorney, Agent, or Firm—Todd Deveau; Ryan A. Schneider; Troutman Sanders LLP

(57) ABSTRACT

A technique for building touch-sensitive panels which permits construction of large, low-cost electronic whiteboards with improved feel. The electronic whiteboards are of the resistive membrane type, in which a touch on a flexible membrane causes the membrane to come into contact with a surface and that in turn changes the resistances across the membrane and the surface, permitting determination of the location of the touch. A gap between the flexible membrane and the surface is maintained primarily by the use of relatively large spacing structures located between the membrane and the surface, instead of by tension on the membrane. The use of large spacing structures permits the surface to be made using relatively irregular and therefore low-cost material. The spacing structures are backed by an elastic layer, which permits the spacing structures to yield to a touch on the screen. The spacing structures consequently do not interfere with writing on the screen and the combination of yielding spacing structures and low tension on the membrane provides a surface with a better "feel".

11 Claims, 3 Drawing Sheets

SPACING STRUCTURES FOR LARGE TOUCH PANELS

BACKGROUND OF THE INVENTION

1. Field of the invention

The invention relates generally to touch-sensitive panels of the type used as computer input devices and more specifically to touch-sensitive panels in which the touch brings two surfaces into closer proximity and that in turn causes changes in the physical properties of either or both surfaces that permit detection not only of the touch but also determination of its location in the panel.

2. Description of the prior art

Touch panels that work by detecting that surfaces have been brought into close proximity will be termed in the following membrane touch panels. One class of such membrane touch panels is resistive membrane touch panels. As described for example in U.S. Pat. No. 4,965,421, Epperson, Particulate spacers for touch sensitive overlay panel applications, issued Oct. 23, 1990, one of the surfaces is rigid and the other is flexible. The flexible surface is located a small distance above the rigid surface. Both surfaces conduct electricity. When a touch causes the flexible surface to come in contact with the rigid surface, a short develops between the surfaces. The short changes the resistance across the surfaces, and the change in resistance in turn can be used to determine the location of the short and from that, the location of the touch.

It is of course imperative in membrane touch panels that the gap between the surfaces be maintained when the touch panel is not being touched. Two general techniques have been developed for maintaining the gap:

- placing spacers at the edges of the panel and keeping enough tension on the flexible surface that a gap between the flexible and rigid surfaces that is substantially the width of the spacers is maintained across the entire surface; and
- placing spacing structures between the flexible and rigid surfaces throughout the panel. A touch causes the flexible surface to come into proximity to the rigid surface between the spacing structures. In resistive membrane touch panels, the spacing structures are insulators.

Spacers and tension have generally been used in large touch panels, for example, those employed in touch-sensitive electronic whiteboards, while the spacing structures have generally been employed in transparent touch screens designed to be placed over computer displays. A description of a touch-sensitive electronic whiteboard may be found in U.S. Pat. No. 5,790,114, Geaghan, et al., Electronic whiteboard with multi-functional user interface, issued Aug. 4, 1998, and a description of a touch screen using spacing structures throughout the panel may be found in the Epperson patent referenced above.

Both techniques for maintaining the gap have had limitations. The spacing structures used with transparent touch screens have had to be so small as to be substantially invisible to the naked eye and have consequently typically had a size on the order of 0.00005 inches. The use of spacing structures of this size obviously requires close manufacturing tolerances and the need for such tolerances has prohibited the use of the technique for large, relatively low-cost touch panels such as those used for electronic whiteboards.

The tolerances are not so close when tension is employed, but the surface must be flat, that is, it may not have bumps that are near the height of the gap, and this requirement is made more difficult by the fact that the tension that must be applied to the flexible surface to maintain the gap tends to cause the rigid surface to bow or warp. As the size of the panel increases, getting it flat in the first place and keeping it flat under the tension being applied to the flexible surface becomes more and more difficult.

Moreover, the fact that tension has been used to maintain the gap has meant that the writing surface of the touch panel has had a "springy" feel. A user of the touch panel must press down hard enough with the writing instrument to overcome the springiness. Where the writing instrument makes marks of its own, as is the case with the markers used with electronic whiteboards, it is even possible that a user who does not press down hard enough may make marks on the whiteboard that are not recorded by the computer connected to the whiteboard. What's worse, the amount of pressure required to overcome the springiness varies across the whiteboard, with the amount of pressure increasing as the writer approaches the spacers at the edges of the whiteboard. The springiness and the associated possibility of loosing information are of course particularly undesirable in an electronic whiteboard, since the whole purpose of an electronic whiteboard is to record what the users write on it. Here, too, the problem increases as the board's size and the amount of tension required to maintain the gap increase. What's more, the problems with springiness are only aggravated by any tendency of the board to bow or warp under the tension.

The problems caused by surface irregularities and bowing and warping can be dealt with by careful selection of materials for the surface and careful manufacturing techniques, but these add to the cost of the panels and, in the case of low-cost panels such as those required for electronic whiteboards, the problems of the tension techniques have effectively limited the maximum size of commercially practicable electronic whiteboards made using membrane touch panels. The problems caused by the springiness of the writing surface are, however, inherent in the use of tension to maintain the gap between the flexible and rigid surfaces and cannot be solved by the use of even the best materials and manufacturing techniques.

It is thus an object of the present invention to provide touch panels which do not have a springy writing surface, which may be manufactured at a low cost, and which do not have the size limitations that are presently imposed by the need for low-cost manufacture.

SUMMARY OF THE INVENTION

The invention achieves its objects by using spacing structures to separate the surfaces in large touch panels. The spacing structures make it unnecessary to use tension to maintain the gap between the flexible and the rigid surface and the spacing structures are sized and placed in a fashion which permits irregularities in the rigid surface. An elastic element permits a spacing structure to yield to pressure from a touch or a writing instrument, and thereby prevents a user who is writing on the panel from feeling the spacing structure and prevents the spacing structure from affecting the movement of the writing instrument on the panel. The invention thus makes it possible to produce large, low-cost touch panels that have a superior feel, since there is little or no springiness for the writer to overcome and the writer does not sense the spacing structures."

The foregoing and other objects and advantages of the invention will be apparent to those skilled in the arts to which the invention relates upon perusal of the following Brief description of the drawing and Detailed description.

Figure 1:
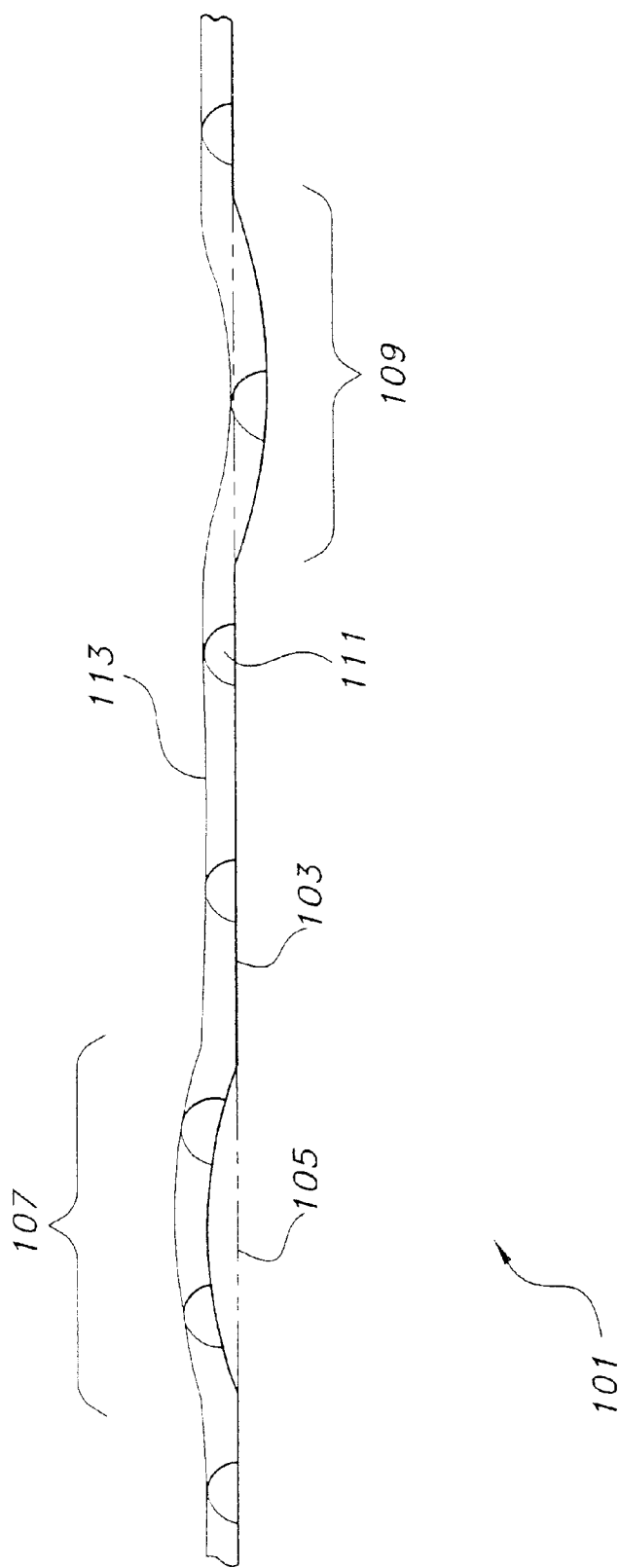
FIG. 1 shows how properly sized and spaced spacing structures may be used in a touch panel to overcome the requirements that the rigid surface be flat and that the flexible surface be under substantial tension.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first describe the basic notions involved in the invention and will then describe a resistive membrane for an electronic whiteboard that is made using the techniques.

Using spacing structures to overcome irregularities in the surface: FIG. 1

As indicated above, a problem with large membrane touch panels is that the rigid surface above which the flexible surface is maintained by tension must be flat both in the sense that it cannot have irregularities such as humps and in the sense that the tension applied to the flexible surface cannot cause the rigid surface to warp or bow. Because of this requirement, large membrane touch panels have typically had to use heavy steel sheets as backing for the rigid surface, instead of cheaper and often lighter materials such as chipboard or plywood panels. However, even the use of materials like steel for backing has not solved the problem of the springiness of the writing surface.

The use of spacing structures to maintain the gap between the rigid surface and the flexible surface both permits greater irregularities in the rigid surface and greatly reduces the amount of tension that must be applied to the flexible surface. FIG. 1 shows a cross section 101 of a membrane touch panel which employs spacing structures to maintain the gap between the rigid surface and the flexible surface. The rigid surface appears in the figure at 103; the flexible surface is the conducting bottom side of flexible sheet 113. As indicated by the deviations from dashed line 105, which indicates a flat surface, surface 103 has irregularities such as hump 107 and depression 109. Spacing structures 111 are sized such that they are slightly higher than the greatest deviation from line 105 in surface 103. The spacing structures 111 are placed closely enough together that flexible sheet 113 does not sag between them enough for its bottom side to touch surface 103. They thus ensure that flexible sheet 113 follows the contours of the irregularities in surface 103 without touching surface 103 unless flexible sheet 113 is being depressed by a touch. Moreover, since flexible sheet 113 is supported by spacing structures 111, there need only be enough tension on flexible sheet 113 to prevent it from wrinkling, and the material used to back surface 103 need have much less resistance to warping and bowing than when tension is used to maintain the gap between surface 103 and sheet 113. In consequence, large touch panels can be constructed using backing materials such as chipboard instead of steel sheets. Finally, the use of spacing structures 111 ensures that the gap between surface 103 and sheet 113 can be relatively small even in a large touch panel and that it will remain substantially the same throughout the entire area of the panel, solving the problems caused by springiness in membrane touch panels that use tension to maintain the gap between sheet 113 and surface 103. It should be pointed out here that while FIG. 1 shows the spacing structures as being applied to surface 103, they could equally be applied to flexible sheet 113 or be an independent structure between surface 103 and sheet 113.

Using large spacing structures in touch panels that are used for writing

Where the user of a touch panel does nothing more than touch the panel, the use of large spacing structures is by itself sufficient to overcome the problems caused by using tension to maintain the gap. Examples of such touch panels are panels used in displays such as those found in museums or information kiosks: when the user touches an area of the panel, the user receives information about the area he or she touched. However, the large spacing structures cause problems when users write on the touch panels, as is the case when the touch panels are used as electronic whiteboards or as transparent touch screens. Not only can the user feel it when the writing instrument he or she is writing with encounters the spacing structure, the spacing structure can deflect the writing instrument. For example, if the spacing structures are applied in a regular pattern, the writing instrument will tend to follow the "valleys" in the pattern.

This problem can be solved by designing the support structures so that they yield when the point of the writing instrument encounters them. One way of doing this is placing an elastic layer between surface 103 and the material that forms its rigid backing. When the writing instrument encounters a spacing structure, the pressure from the point of the writing instrument forces the spacing structure into the elastic layer, and the writing instrument can consequently pass over it without disturbance. When the writing instrument has passed, the elastic layer rebounds and the supporting structure again maintains the gap between surface 103 and flexible sheet 113. Another way of achieving this end would be to put the elastic layer between the conducting layer on the bottom of sheet 113 and the rest of the sheet; still another would be to make the support structure itself of a material which yields when the writing instrument encounters it and which regains its shape after the writing instrument passes.

Figure 2:
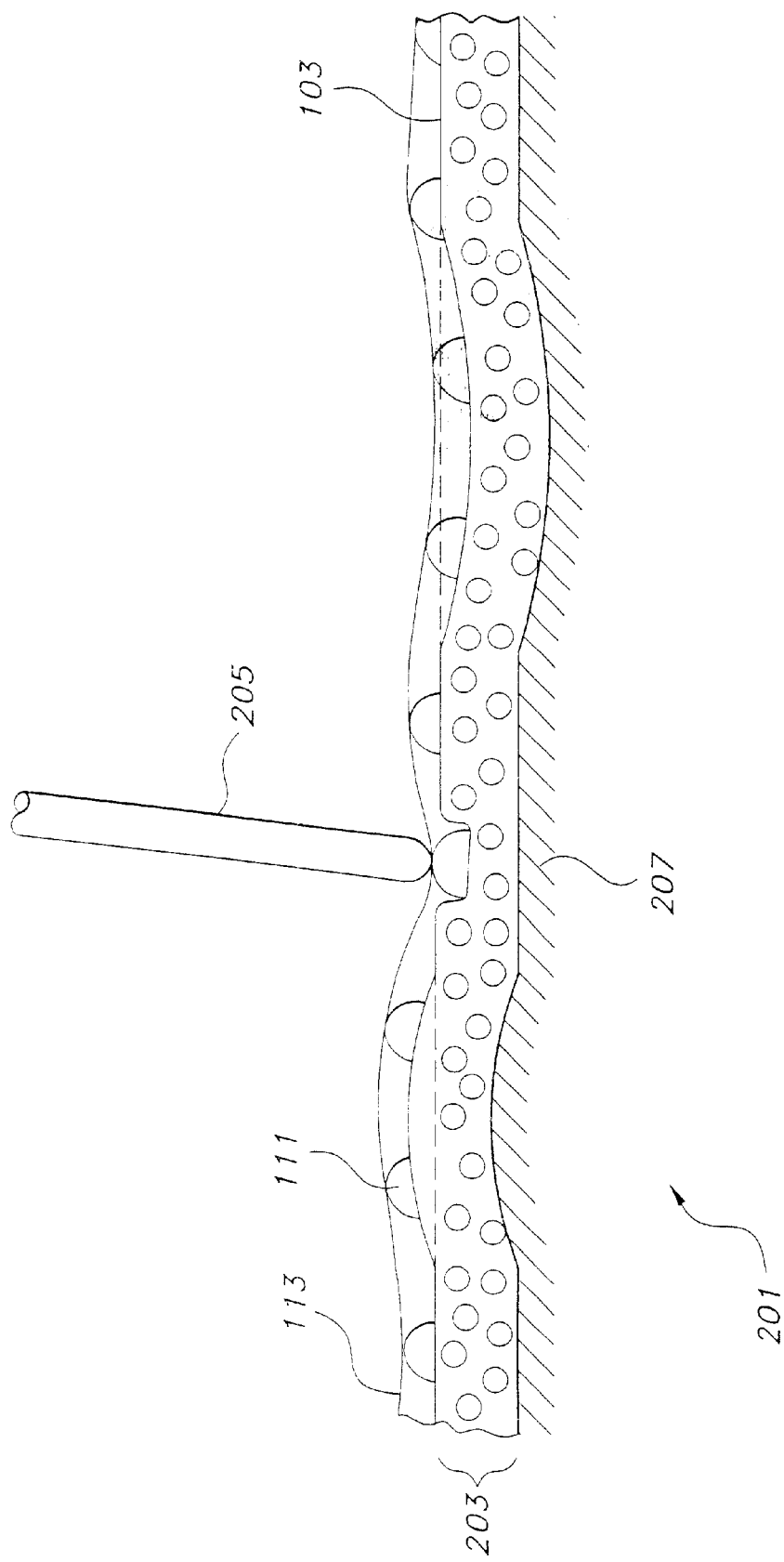
FIG. 2 shows how an elastic layer under the rigid surface may be used to overcome the problems that the use of large spacer structures causes for the "feel" of the panel's writing surface.

FIG. 2 shows a surface 103 with an elastic layer and also shows how the elastic layer permits the support structure to "disappear" when the writing instrument passes over it. Cross section 201 of a membrane touch panel shows backing material 207, which supports surface 103, elastic layer 203 between backing material 207 and surface 103, spacing structures 111, flexible sheet 113, and a writing instrument 205 which is passing over a spacing structure 111. As writing instrument 205 passes over support structure 111, the pressure of writing instrument 205 on support structure 111 deforms elastic layer 203, permitting support structure 111 to yield to writing instrument 205. When writing instrument 205 has passed on, elastic layer 203 regains its original shape and support structure 111 once again supports flexible sheet 113. It should be noted at this point that the inputs from membrane touch panels are interpreted as points, with a line being treated as a sequence of points, and that there is consequently no requirement that flexible sheet 113 be continuously in contact with surface 103 when a line is being drawn on the touch panel.

Figure 3:
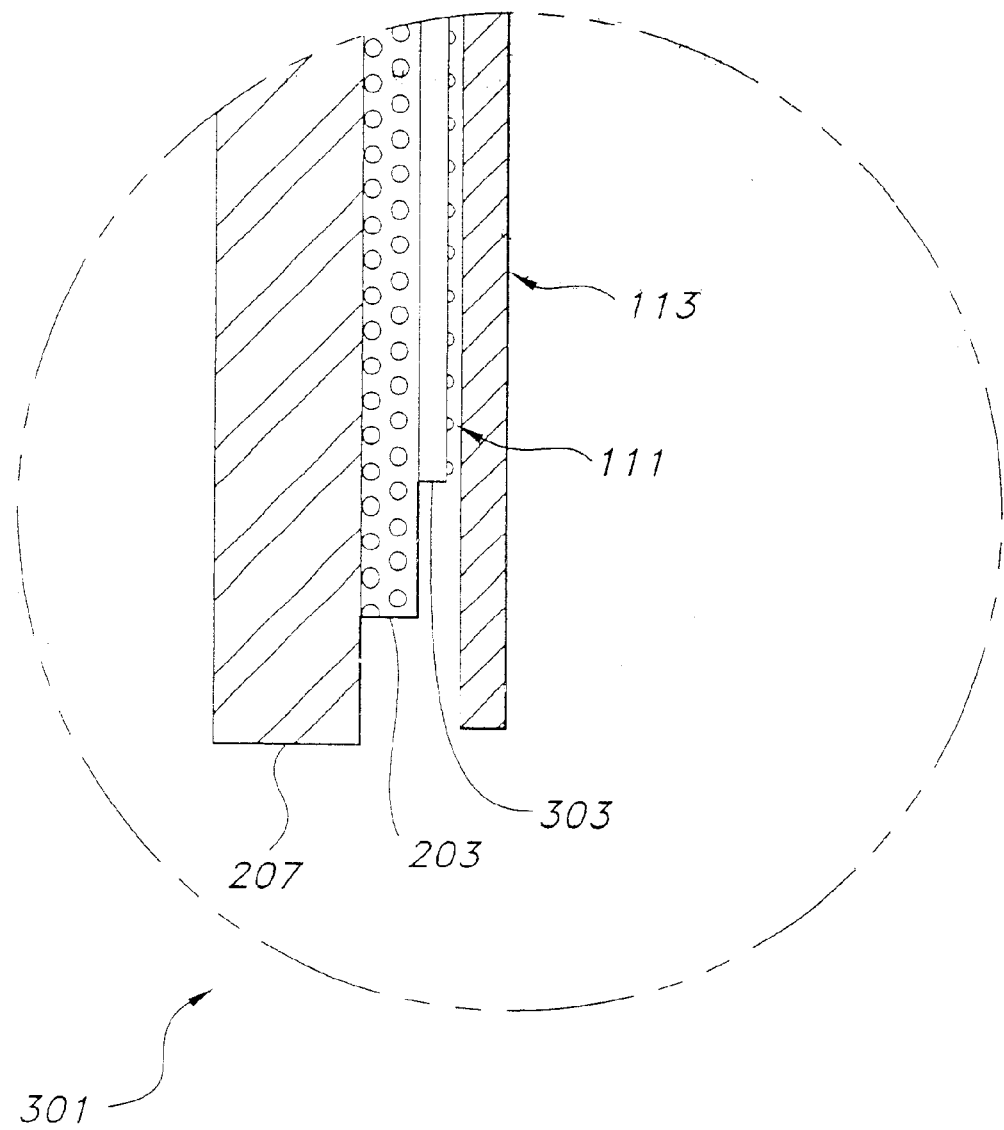
FIG. 3 is a cross section of an electronic whiteboard that has been constructed according to the principles of the invention.

An electronic whiteboard that employs large spacing structures backed by an elastic layer The principles just described have been used to build electronic whiteboards that use resistive membrane technology. FIG. 3 is a cross section of such a board. In that figure, support 207 is made of particle board. Applied to support 207 is a 0.031" layer of LS foam, which implements elastic layer 203; on top of that is a 0.0038" thick layer 303 of clear polyester film to which has been applied an 0.0007" thick layer of carbon, which provides a conductive surface. The film and the carbon together implement surface 103. The spacing structures 111 are insulating spacer dots which are silk-screened onto the layer of carbon. Each dot has a diameter of 0.024" and a height of 0.0015 to 0.0025 in the preferred embodiment, though a height of 0.0025"–0.0035" would be more desirable. The dots are arranged in a grid whose intersections are 0.20" apart. Flexible sheet 113 is implemented by means of a polyester sheet to whose bottom side a layer of carbon has been applied and to whose top side a writing surface has been applied. The writing surface is generally white and is specially adapted to the erasable markers used with whiteboards.

With the implementations of support 207, elastic layer 203, surface 103, spacing structures 111, and flexible sheet 113 just described, electronic whiteboards of sizes ranging up to 4' by 6' have been constructed and it appears that the construction technique places no limit on the size of the whiteboards. In these whiteboards, flexible sheet 113 is tensioned only enough to prevent wrinkles. Users of the whiteboards perceive the white board as having a uniform, non-springy writing surface. Because of the foam layer, the users cannot feel the spacer dots when they touch the board or write on the whiteboard with a standard marker.

The construction technique further substantially reduces the costs of materials and manufacturing, particularly for large whiteboards. Because the spacer dots support the flexible sheet even in the presence of irregularities in surface 103, the boards may be constructed using low-cost materials such as particle board for supporting structure 207 rather than steel sheets. Moreover, since the flexible sheet is no longer under high tension, there is no need for the materials required to maintain that tension. For example, the flexible sheet can simply be glued around the edges of the particle board, instead of being wrapped around the steel sheet under high tension and attached to the back of the steel sheet. Finally, the manufacturing complications caused by the fact that the flexible sheet is under tension are all avoided. Whiteboards constructed according to the techniques described herein are thus both cheaper to make and more satisfactory to their users than whiteboards in which tension is used to maintain the gap between flexible top sheet 113 and surface 103.

CONCLUSION

The inventors of the techniques described above have described to those familiar with the art of making membrane touch panels the best mode presently known to them of making and using their invention in a whiteboard that is constructed using a resistive membrane touch panel. However, as will be immediately apparent to those skilled in the art of membrane touch panels, the techniques just described can be used in any touch panel that detects a touch by means of physical effects produced when two surfaces come into close proximity. It will also be apparent that the silk-screened spacer dots of the preferred embodiment represent only one of many techniques for making spacing structures, that the spacing structures may be attached to either surface 103 or to flexible sheet 113 or to neither, and that the elastic element may be part of surface 103, of sheet 113 or, of the spacing structures. For example, in some applications, the spacing structures may be a plastic grid inserted between surface 103 and flexible sheet 113. Moreover, the size and arrangement of the spacing structures will depend on the application for which the touch panel is intended and the same will be the case with the materials used for flexible sheet 113, bottom surface 103, and elastic layer 203.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. An electronic whiteboard that employs conducting surfaces in conjunction with a writing surface of the whiteboard to detect movement of a writing instrument on the writing surface, the conducting surfaces being separated by a gap and the electronic whiteboard having the improvement comprising:

insulating spacing structures that maintain the gap and are located therein; and an elastic element also located within the gap between the conducting surfaces and positioned in association with the insulating spacing structures so that the elastic element yields to pressure on a given one or more of the insulating spacing structures resulting from the movement.

2. The electronic whiteboard set forth in claim 1 wherein:

there are irregularities in a conducting surface; and the spacing structures are sized and spaced such that the irregularities do not cause the conducting surfaces to come into contact.

3. The electronic whiteboard set forth in claim 2 further comprising:

a supporting structure for the conducting surface having the irregularities; and wherein the irregularities are a consequence of irregularities in the supporting structure.

4. The electronic whiteboard set forth in claim 1 further comprising:

a supporting structure for one of the conducting surfaces.

5. The electronic whiteboard set forth in any of claims 3 or 4 wherein:

the elastic element is located between the supporting structure and the conducting surface that has the supporting structure.

6. The electronic whiteboard set forth in claim 5 wherein:

the spacing structures are spacer dots on the conducting surface that has the supporting structure.

7. The electronic whiteboard set forth in claim 6 wherein:

the spacer dots have a height in the range of 0.0015" to 0.0035".

8. The electronic whiteboard set forth in claim 7 wherein:

the spacer dots are arranged in a grid whose intersections are 0.2 inches apart.

9. The electronic whiteboard set forth in claim 8 wherein:

the spacer dots have diameters that are 0.024 inches.

10. The electronic whiteboard set forth in claim 9 wherein:

the elastic element is a layer of foam.

11. The electronic whiteboard set forth in claim 1 wherein:

the writing surface need only have sufficient tension to keep the writing surface from wrinkling.

* * * * *